United States Patent [19]

Burson et al.

[11] 4,276,570
[45] Jun. 30, 1981

[54] METHOD AND APPARATUS FOR PRODUCING AN IMAGE OF A PERSON'S FACE AT A DIFFERENT AGE

[75] Inventors: Nancy Burson, 548 Broadway - 4th Floor, New York, N.Y. 10012; Thomas D. Schneider, Boulder, Colo.

[73] Assignee: Nancy Burson, New York, N.Y.

[21] Appl. No.: 36,847

[22] Filed: May 8, 1979

[51] Int. Cl.³ .............................................. H04N 7/18
[52] U.S. Cl. ...................... 358/903; 358/93; 364/515; 340/725; 340/747
[58] Field of Search .................. 364/515, 521; 358/93, 358/903, 104; 340/701, 707, 747, 725

[56] References Cited

U.S. PATENT DOCUMENTS

| | | | |
|---|---|---|---|
| 3,772,465 | 11/1973 | Vlahos et al. | 352/38 |
| 4,060,713 | 11/1977 | Golay | 364/515 |
| 4,064,490 | 12/1977 | Nagel | 358/141 |
| 4,104,625 | 8/1978 | Bristow et al. | 179/1 SP |
| 4,148,070 | 4/1979 | Taylor | 358/160 |
| 4,181,971 | 1/1980 | Frey et al. | 364/521 |

OTHER PUBLICATIONS

W. R. Tobler, "Comparison of Plane Forms", Apr. 1978, pp. 154–162, Geographical Analysis, vol. X, No. 2.

Arun N. Netravali, "Interpolative Picture Coding Using a Subjective Criterion", May 1977, pp. 503–507, IEEE Trans. on Comm. Cl., 364–515.

Primary Examiner—Marc E. Bookbinder
Assistant Examiner—Edward L. Coles
Attorney, Agent, or Firm—Kenyon & Kenyon

[57] ABSTRACT

In order to simulate the appearance of a different age on a person's face, a picture of an old face and a corresponding young face are recorded and the differences between the old and young face found and recorded. A picture of the person's face to be simulated at a different age is then recorded, modified with the differences and the image resulting after modification is displayed.

14 Claims, 16 Drawing Figures

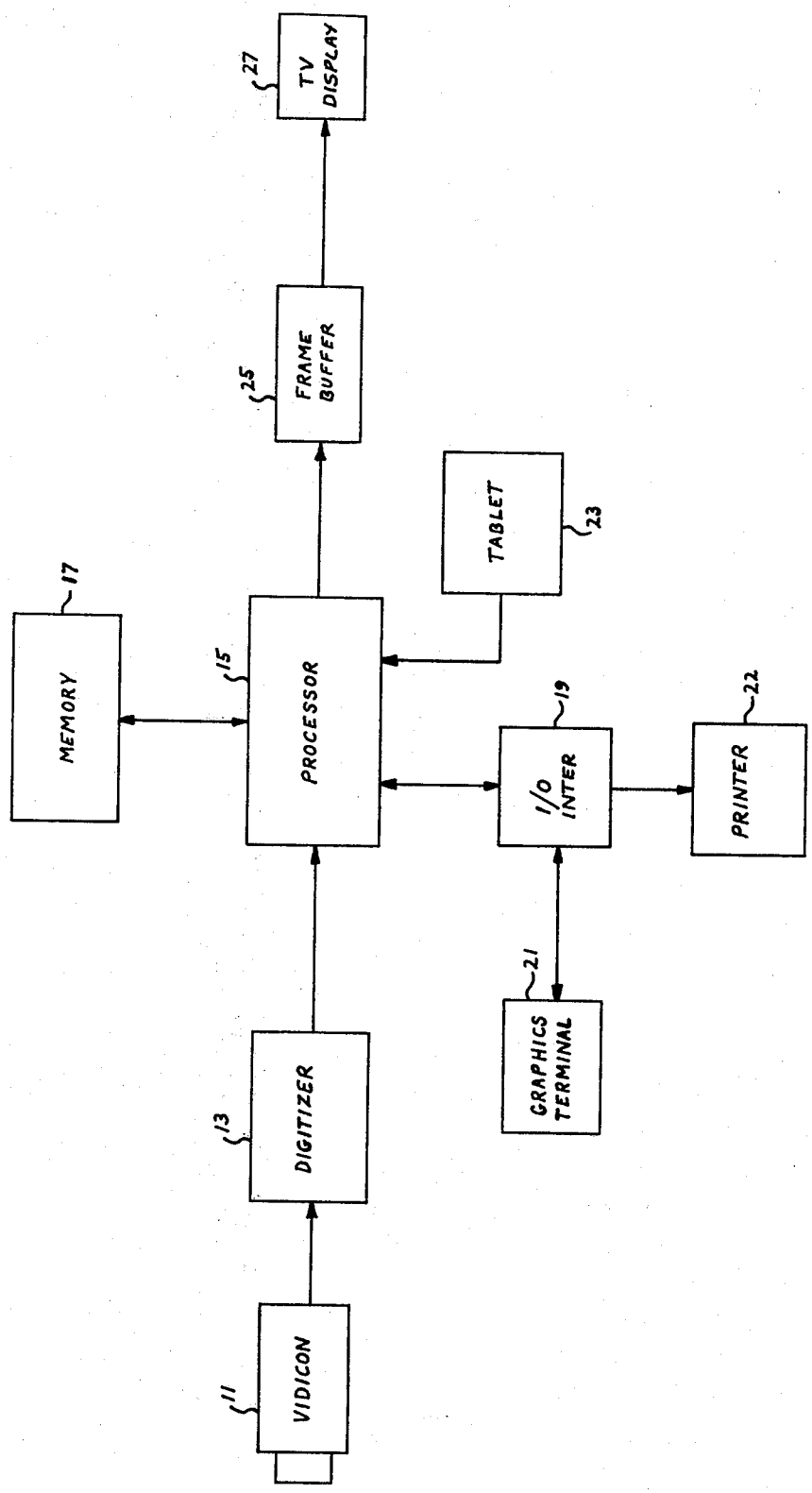

METHOD AND APPARATUS FOR PRODUCING AN IMAGE OF A PERSON'S FACE AT A DIFFERENT AGE

BACKGROUND OF THE INVENTION

This invention relates to graphics in general and more particularly to a method and apparatus for simulating the appearance of a different age in a person.

It is sometimes desirable to predict or foresee how someone of a relatively young age will look a number of years later. Such may be desirable simply from the point of view of curiosity, or for more practical reasons. For example, in the performing arts such as television, movies and the theater, very often a person must be aged during the performance. Aging is done through the application of make-up by those experienced in that art. Further, the same make-up may need to be applied a number of days during shooting. A guide for a make-up artist to help him in making up the young person as he would look when he had aged would be most helpful. Conversely, it may also be desirable to see how an older person would look at a younger age.

Thus, a need exists for a relatively simple method and apparatus which permits transforming an image of a person into an image of that person as he would appear a number of years later, or earlier, either simply to satisfy curiosity or to aid in making up the person to look older or younger.

SUMMARY OF THE INVENTION

It is thus the object of the present invention to provide a method and apparatus for transforming the image of the face of a person to a corresponding image of that person at a different age.

The present invention starts out with the recognition that there are a finite number of typical aged faces. Examples are the faces of thin men, fat men, fat women, and thin women. In other words, in each of these categories, there are certain characteristics which change in almost all faces of a given type, e.g., the types of lines which appear, etc.

Based on this premise, the first step in carrying out the present invention is that of taking a picture of a young person and storing it. Storage may be photographic storage or may be digitized computer storage. Next, a corresponding face of an aged person with the same general facial features is photographed and stored. This corresponding face may be achieved simply by aging the same person using make-up, and taking a second picture. The next step in the process is to find the differences between the young face and the older face. This may also be done photographically. For example, one can make a negative of a young face and a positive of the same face after aging by make-up, and overlay the two so that only the differences will show up when printed. These differences are then stored, again, either in the form of photographic storage or in the form of digital computer storage.

If a system is to have the capability of accepting all types of people, these differences would of course, be stored for all the different types of faces identified such as the aforementioned thin man's face, fat man's face, thin woman's face and fat woman's face. When it is desired to produce an image of a face, other than the one used in the beginning, a picture of the new face which is to be aged or made look younger, is made and stored. To this new face are then added or subtracted, the differences, or fractions thereof, which have been previously stored, and an image of the young face plus or minus the differences is displayed either photographically or on a video monitor.

If the old face which was used for generating the differences, and the new face, have exactly same dimensions, with respect to facial location such as eyes, nose, ears, etc., overlaying presents no problems. However, in most cases the faces will not be exactly alike. In such a case, the present invention includes the further step transforming the old face, from which the differences have been obtained, so that it matches the new face. If the process of the present invention is being carried out optically, i.e., photographically, suitable lenses can be used for this purpose. Lenses which can stretch or compress an image along one axis are well known in the art. Placing two such lenses in series, one for operating along the vertical axis of the face, an another for operating along the horizontal axis of the face, matching up the two faces is possible.

However, in accordance with the preferred embodiment of the invention, the storage of images and the transformations are carried out by a digital computer. In such a case, the images are photographed utilizing a vidicon camera, preferably one providing a digital output. In general, the area of the facial image being photographed is divided into $M \times N$ pixels or image points depending on the desired resolution. Each pixel is represented by an 8 bit word, for example, giving its gray scale information. The vidicon output is digitized in this manner into a map of $M \times N$ eight bit words which are stored in an appropriate memory, such as a disk memory, under the control of a central processing unit which may be a mini processor or micro processor. To generate the initial difference from the storage images, the processor simply carries out the necessary subtraction of the young face image from the old face image at each of the pixels to generate another map showing the differences. This information is stored. There remains only the problem of matching the features of the new face to be transformed with the old face and resulting difference which is to be used. Such is accomplished by constructing a standard map of facial features. Each of the important facial features such as the corners of the eyes, the location of the nostrils, the bottoms of the ears, the corners of the mouth, etc., are defined by points or nodes with all of the points interconnected by lines. In effect, such constitutes a standard map consisting of a network of triangles. Although a specific map is shown, others are possible. It is preferred that the map be a topologically invariant grid of triangles. This standard map is stored for the old face, from which the differences were obtained. Coupled to the central processing unit is an interactive terminal including a graphics terminal and means such as a tablet or light pen to modify the graphics displayed thereon. The standard map is displayed on the graphics terminal along with the face that has just been photographed, and the standard map manipulated so as to line up the map nodes with the facial features. The difference features which are stored can be stored in the coordinates of this map or transformed thereto. Thus, knowing the location of the various points on the standard map as they apply to the new face then being photographed and knowing the positions of the difference features with respect to the coordinates on that map, it is then possible to add or subtract the difference features to or from the new face which was photographed and display the transformed face on an appropriate video monitor, preferably in color.

Apparatus according to the present invention which is capable of generating a picture corresponding to a face at a different age includes means to generate a video image of the new face, means to store the image, means to store the difference between an old and a young face, means to superimpose the differences on the new face and means to display the new modified face. Preferably, each of the means to store and the means to modify are digital in nature. Furthermore, in the preferred embodiment, there are also means to match the coordinates of a standard map of the old face from which the differences were taken, to the new face being transformed.

BRIEF DESCRIPTION OF THE DRAWINGS

FIG. 3 is a block diagram of apparatus according to the present invention.

DETAILED DESCRIPTION OF THE INVENTION

FIGS. 1a through 1j are helpful in understanding the method of the present invention.

Figure 1A:
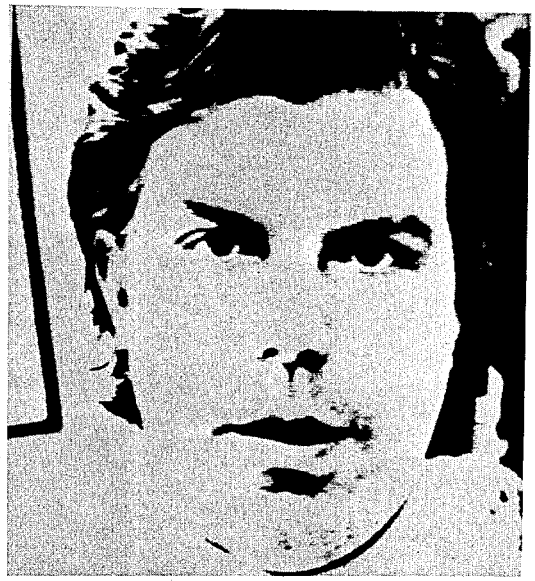
FIGS. 1a-1j are facial images at various stages in the process of the present invention.
Figure 1B:
Figure 1C:
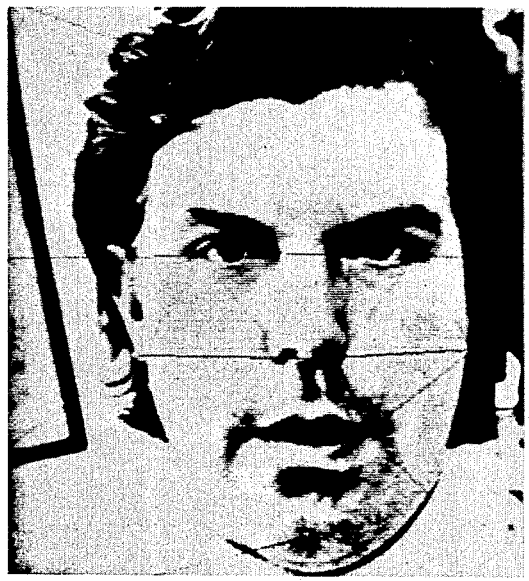
Figure 1D:
Figure 1E:
Figure 1F:
Figure 1G:
Figure 1H:
Figure 1I:
Figure 1J:

In accordance with the method of the present invention a picture is first made of a young face. Such a young face is illustrated by FIG. 1a. Then a picture is made of an older face; this is shown in FIG. 1b. Next, the two faces are matched with respect to features. Although, as noted above, this may be done optically, what is illustrated in FIGS. 1c and 1d is the mapping of the two faces. In other words, a standard map which locates certain facial features, such as the edges of the eyes, the nostrils, the edges of the mouth, the center of the chin, etc., is overlaid on the face. This is done on both faces, on the young face as shown on FIG. 1c, and the older face as shown in FIG. 1d. Next, the young image is transformed (warped) so that the location of the various image points or nodes of the standard map system are in the same X and Y locations as they are on the older face. This image transformation is illustrated by FIG. 1e. The next step comprises subtracting the young image from the old image. The results of this subtraction are shown on FIG. 1f. Next, an image of another young face is obtained and stored as shown on FIG. 1g. As with the other images, this image now is mapped as shown on FIG. 1h. The difference image which was previously stored is warped or transformed so that its mapping matches the mapping of the new young face which is to be aged. Finally, the difference features of FIG. 1f are transformed into the proper coordinates obtained from mapping the new young face as shown in FIG. 1h and are added to the new face of FIG. 1g to obtain an aged image as shown in FIG. 1j. FIG. 1i illustrates the negative of the transformed image; this image is not used in the process.

Figure 2:
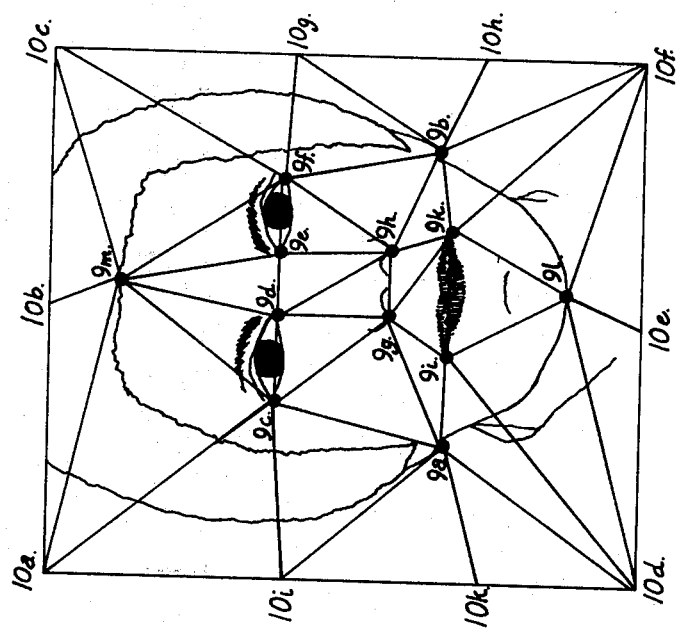
FIG. 2 is a diagram of a possible selection of nodes for the standard map and a standard map of triangles connecting said nodes.

FIG. 2 diagrammatically indicates the selection of image points for constructing the standard map. As illustrated points or nodes are selected at the bottom of each ear (nodes 9a and 9b), the corners of each eye (nodes 9c to 9f), the edge of the bottom of each nostril (nodes 9g and 9h), the ends of the mouth (nodes 9i and 9k), and the center of the chin (node 9l). Another point is located at the center of the top of the forehead (node 9m), and the overall image framed by three points (10a, b and c) across a line on the top, three points (10d, e and f) across a line on the bottom, points 10i and k on the left and points 10g and h on the right. By interconnecting these points and nodes, a map such as that shown on FIG. 2 which comprises a group of triangles is created.

Apparatus for carrying out the method of the present invention is illustrated on FIG. 3, it includes a vidicon 11, preferably a digitizing camera such as the type available from the Video Standard Company. The output of the vidicon 11, is digitized in a digitizer 13, also of conventional design. Any type of device which is capable of digitizing an image, may be used. Furthermore, the digitizing equipment, rather than scanning an actual face, can scan a photograph of the face. The information out of the digitizer 13 will be a series of 8 bit words, for example, each representing the gray scale value one of M×N pixels wherein the number of columns (vertical) and the number of rows (horizontal) of pixels make up the image. This information is loaded into a memory 17 by a processor 15 which can be a micro processor or mini processor. An example of such a device is the Interdata 732 mini computer processor, Model No. 1122. Once all of the image or face has been scanned or digitized, there is then stored in a memory 17 a complete map of M×N pixels, each represented by 8 bits. Also stored in this memory is difference information which was obtained by previously viewing an older face and a younger face and finding the difference. The pixel information is basically available in the form of X-Y coordinate information with respect to the M×N map of the images in X-Y coordinates. Also stored in memory 17 is the standard map of FIG. 2 for the older image which was used in generating the difference information. The conversion of the X-Y information into coordinates with respect to the map comprises a single conversion from the skew cartesian coordinate of one triangle to a skew cartesian coordinate of the other triangle.

Figure 2A:
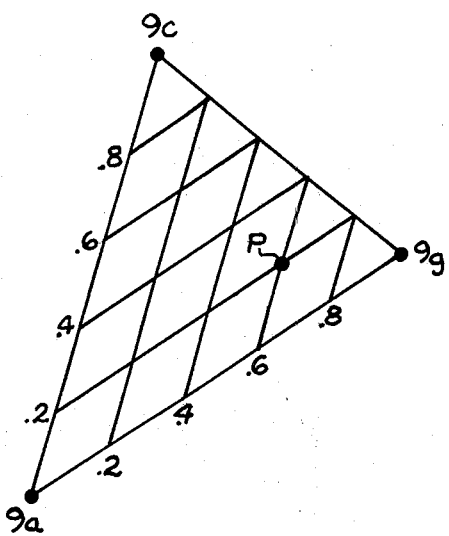
FIGS. 2a-2c are diagrams helpful in understanding the warping operation.
Figure 2B:
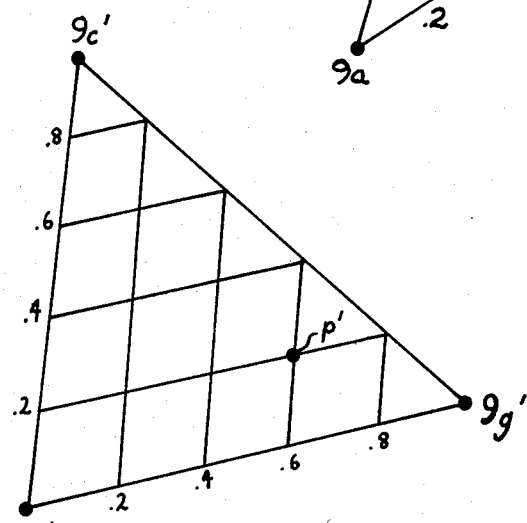
Figure 2C:
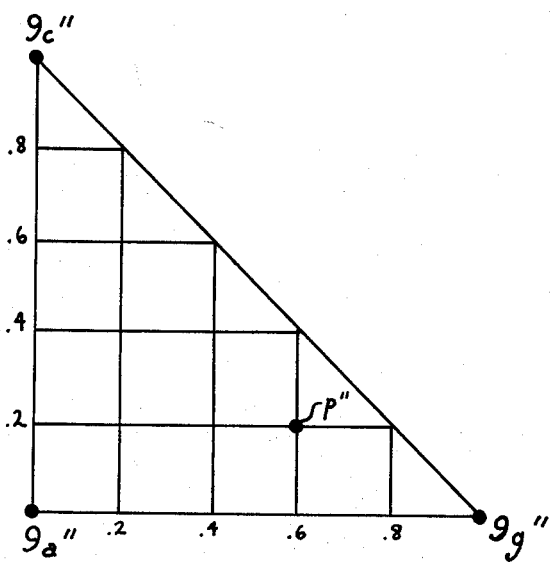

This can be better understood with reference to FIGS. 2a-2c. FIG. 2b represents the triangle defined by the nodes 9a, 9c and 9g taken from FIG. 1h, the young face image. FIG. 2a is a picture of the corresponding triangle from FIG. 1d, the old face. FIG. 2c is a right-angle triangle containing conventional X-Y coordinates. As compared to the triangle of FIG. 2c, it can be seen that in the triangles of FIGS. 2a and 2b the coordinate systems drawn thereon are skewed. In each case, the point 9a, 9a' or 9a" is the origin and the length of the vectors from the origin to points 9c, and 9g, 9c' and 9g' and 9c" and 9g" are considered to be unity. Thus, each of the divisions drawn on the triangle corresponds to a relative distance of 0.2. If one considers point P in the old image of FIG. 2a having the coordinates 0.6, 0.2, that same point designated P' on FIG. 2b will have the same coordinates and a corresponding point P" on the triangle of FIG. 2c will also have the same coordinates.

Within the computer the location of the nodes of the image of the old face of FIG. 1d, which is also the coordinate system for the difference image, and the locations of the nodes for the young face image of FIG. 1h will be stored in X-Y coordinates. Similarly, the X-Y locations of each pixel, or image point, such as image points existing at points P and P' are known. What is necessary is to convert image information in the coordinate system of FIG. 2a into information in the coordinate system of FIG. 2b so that addition or subtraction can be carried out. In particular, it is necessary to add or subtract the difference information which is in the coordinate system of FIG. 2a to the image being transformed which is in the coordinate system of FIG. 2b. Although this could be done by first converting from the coordinate system of FIG. 2a to that of FIG. 2c and then converting back to the coordinate system of FIG. 2b, there is a much more efficient way to do it.

The computer typically will include a subroutine for scanning in increments. This scanning is, of course, accomplished in X-Y coordinates. This is the reason for the imaginary triangle of FIG. 2c, which in fact does not exist in this system. The computer can be programmed to carry out a scan beginning at the point $9a''$ which is the origin. In doing so, it will generate X and Y coordinates. What is meant when one speaks of scanning is an operation in which the computer looks at all points within the triangle. Using well known coordinate transformations having as inputs the stored locations of the coordinates of the nodes of the triangles of FIGS. 2a, 2b and 2c, it becomes possible while scanning the imaginary triangle of FIG. 2c to at the same time scan the triangles of FIGS. 2a and 2b. Thus, using a scanning subroutine both triangles are scanned at the same time. In other words, the scan routine along with the transformation generates the image information corresponding to each scan point on the triangle of FIG. 2c. Since at any point in the scan, a corresponding point in all three triangles is being examined, it thus becomes possible to directly add the difference image at that point to the image being transformed and to store the result. Thus, with the single scan, all the information necessary for carrying out the addition or subtraction is generated.

Also in carrying out the scanning it is important to determine the step size or distance necessary to insure that there are no blank spots. First, it must be remembered that it is the image which is being transformed which governs how many steps are necessary. In the example above, this is the young image of FIG. 1h which is being aged. The reason for this is that the direction of transfer is to this image. It does not matter how widely spaced the bits on the difference or old image are as long as they are packed close together on the image being transformed. Scanning takes place in X and Y increments. Thus, each of the vectors in each triangle, i.e., vectors corresponding to those extending between nodes $9a'$ and $9c'$ and those extending between $9a'$ and $9g'$ for FIG. 2b (the young image being transformed) must be considered. Since these vectors are skewed, i.e., they do not lie on the X or Y axes, it is necessary to find their component along the X axes and the Y axes. Since the node locations are known, this may be done simply by subtraction. Whichever of the two components contains the greater number of steps is then selected as the number of steps required when scanning along the corresponding X or Y axes of FIG. 2c. As noted, this is done for each vector. Since the scan subroutine operates not with the number of steps but with step increments, once the number of steps are known it is necessary to determine the reciprocal of the larger number of steps and then use this as the increment for the respective X and Y scans.

The apparatus also includes a conventional IO interface 19, which couples the processor 15 to a terminal 21, and a printer 22. Also coupled to the processor is a tablet 23 which permits interaction with the graphics terminal. Typically, as an example of the device which can be used is the type of digital tablet available from Summagraphics Digital Tablet. The terminal 21 may be a Digital Equipment Corp. model VT-52. Also coupled to the processor is a frame buffer 25 and a video display 27. The frame buffer 25 may be a Ramtek graphic display system Model RM 9300, and the display 27, an MGA Color Video Monitor Model 351A, or C851, made by the Mitsubishi Electric Company. The purpose of the frame buffer is to buffer the pixel information which, after transformation is transferred out of the processor for display.

In operation, the picture of the young face to be aged is displayed on the frame buffer 25 and TV display 27 along with the standard map. The tablet 23 is used to interact with the system to adjust the standard map to the face which has just been photographed by the vidicon 11. Once this match-up is made, the old face stored in memory is then transformed into the same coordinates, and, using these coordinates, the previously stored difference information is added to the new young face. On completion of the addition, the new young face, now aged, is provided as an output through the frame buffer 25 to the display 27. Attached hereto is a PL/1 computer program for carrying out the process just described.

Generation of the difference is done in similar fashion. The standard map is aligned with the older face, a young face warped or transformed to match this standard map, with the necessary coordinate transformations carried, the pixel information subtracted and then stored all under control of the attached computer program.

In the embodiment just described, there was only a single old and young face used to generate a single difference. As noted above, it is preferred that a plurality of differences for different types of faces be stored. Furthermore, specific selecting of nodes and an image map given herein, is not the only image map which can be used. Other image maps can equally well be used as can other image transformation techniques. Similarly, the invention is no way limited to the specific hardware elements given as examples above. Basically, any system which permits digitizing a live, or photographic, image of the face and storing pixel information concerning that image which has the capability of turning out coordinate transformation in order to match two images and to then subtract the images to find a difference, which further includes these means to interact with the computer system to match a standard map to a particular image and thereupon carry out the necessary transformations of stored images and add difference features to a new face and display that face, now aged, may be used.

Figure 4:
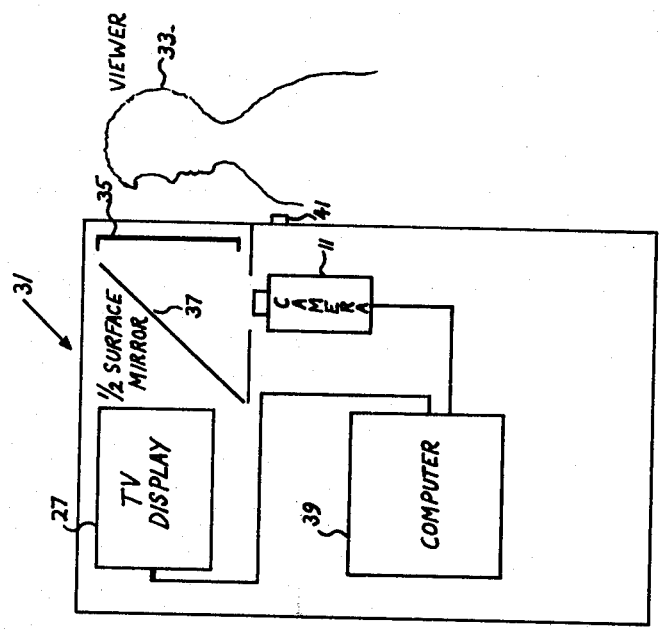
FIG. 4 is a schematic block diagram of the application of the apparatus of the present invention.

FIG. 4 illustrates the possible application of the present invention. In this embodiment, each of the elements of FIG. 3 are installed within a unit or cabinet generally indicated as 31, in front of which a viewer 33 may stand and peer through a window 35. Behind the window 35 is a mirror 37 adapted to reflect the image of the viewer 33 to the television camera 11. The output of the television camera 11 is fed into a computer 39, which will include all of the elements of FIG. 3 which are interposed between the vidicon 11 thereon and the display 27. The output of the computer 39 is fed to the display 27 which can be viewed through the mirror 37 by the viewer 33, the mirror being adapted to transmit light in the direction of the window 35. An operator can be located behind the cabinet 31 with the graphics terminal 21 of FIG. 3 and tablet 23, located at that position to carry out the steps described above to create the aged image. A button 41, coupled to a suitable signalling device behind the cabinet 31 is provided to permit the viewer 33 to signal the operator. Thus, after a short delay, the person 33 looking in the window will see himself aged.

The present invention has been disclosed in terms of aging a young face. However, it should be quite evident that the opposite is also possible, i.e., an older face can be made to look younger. It can be seen that this can be done by means of subtracting the differences from the old face to form a young face in contrast to the aging process in which the differences are added. Thus, more generally, the present invention includes the steps of recording a picture of an old face, recording a picture of a corresponding young face, finding and recording the differences between the old and young face, recording a picture of another face modifying the other face with the differences and displaying the other face modified with the differences. If the other face is a young face, the modifications will be one of adding the differences. If the other face is an old face, the modification will be a subtraction of the differences to create a younger face.

What is claimed is:

1. A method of simulating the appearance of a face at a different age comprising:
   (a) recording a picture of an old face;
   (b) recording a picture of a young face;
   (c) finding and recording the difference between the old and young face;
   (d) recording a picture of a face to be transformed to simulate said face at a different age;
   (e) modifying said face to be transformed with said differences; and
   (f) displaying said face to be transformed modified with the differences.

2. The method according to claim 1 wherein said face to be transformed is a young face and said step of modifying comprises adding the difference to said face to be transformed.

3. The method according to claim 1 wherein said face to be transformed is an older face and said step of modifying comprises subtracting said differences from said face to be transformed to obtain a younger face.

4. The method according to claim 1 and further including warping the young face so that its facial features match those of the old face before finding the differences, and warping the old face to match said face to be transformed, and therewith the difference before modifying said face to be transformed with said differences.

5. The method according to claim 4 wherein all of said steps of recording are done by taking a picture with a television camera and further including digitizing the video output of said camera and storing each of said old face, young face, difference, and face to be transformed in digital form, and wherein said step of displaying comprises displaying on a video monitor.

6. The method according to claim 5 wherein said steps of warping comprise:
   (a) establishing a standard map having nodes at the points of important facial features;
   (b) overlaying said map on a displayed image, so that its nodes match facial features;
   (c) overlaying said map on a second image and causing it to match the features thereof; and
   (d) using coordinates of said map on said second images to warp said second image so as to match the first image.

7. The method according to claim 6 wherein said standard map comprises a topologically, invariant grid of triangles.

8. Apparatus for generating a picture corresponding to a person's face to be transformed to look like that face at a different age comprising:
   (a) means to generate video images of faces, including an old face, a young face and the face to be transformed;
   (b) means to store respectively said images of said old face, said young face and said face to be transformed, said means also capable of storing the differences between an old and young face;
   (c) processing means, coupled to said means to store and means to generate, adapted to:
      (1) subtract said old and said new face to obtain said differences between an old and a young face; and
      (2) modify said face to be transformed with said differences; and
   (d) means to display said face to be transformed, modified with said differences coupled to said processing means.

9. Apparatus according to claim 8 and further including means to digitize said video images.

10. Apparatus according to claim 8 wherein said means to display comprises a television display.

11. Apparatus according to claim 8 wherein said processing means are further adapted to warp one of said old and young faces and with them, said differences before modifying said person's face with said differences.

12. Apparatus according to claim 11 and further including means to digitize each of said image and said differences and wherein said means to store comprise a digital memory.

13. Apparatus according to claim 11 wherein said means to store further include means to store a standard map having nodes at the points of important facial features; and said processing means is further adapted to superimpose said map on a displayed image for said warping and further including means, coupled to said processing means, for displaying an image and said map superimposed and means, coupled to said processing means, for positioning the nodes of said map so that its nodes match said important facial features.

14. Apparatus according to claim 13 wherein said means to store comprise a digital memory and said processing means comprise a digital processor to which said memory is coupled and wherein said means for displaying comprise a graphics terminal and said means for positioning comprise a digital tablet, said graphics terminal and tablet coupled to said digital processer.

* * * * *